United States Patent [19]

Hiscott et al.

[11] Patent Number: 4,753,469
[45] Date of Patent: Jun. 28, 1988

[54] COOKING DEVICE FOR HOLDING FOOD-CONTAINING BAGS

[75] Inventors: William D. Hiscott, Chicago, Ill.; Ina Witlin, North Miami Beach, Fla.; Theodore J. Hasler; Andrew T. Jastrzebski, both of Chicago, Ill.

[73] Assignee: Ekco Housewares, Inc., Franklin Park, Ill.

[21] Appl. No.: 45,372

[22] Filed: May 4, 1987

[51] Int. Cl.$^4$ .................. A47J 43/00; H05B 6/80
[52] U.S. Cl. ...................... 294/1.1; 99/426;
219/10.55 E; 294/26.5; 294/142; 294/165;
426/113; 426/115
[58] Field of Search ............... 294/1.1, 7, 8, 26.5-33,
294/99.1, 137, 141, 142, 144, 164, 165, 166;
99/349, 351, 352, 369, 380, 394, 425, 426, 449,
450; 206/470, 477, 478, 480, 485, 524.1, 527;
220/85 H, 96, 401; 229/902, 903, 905;
219/10.55 E; 248/95, 145.6; 383/6, 13;
426/107, 110, 113-115

[56] References Cited

U.S. PATENT DOCUMENTS

| 419,560 | 1/1890 | Rice | 294/165 X |
|---|---|---|---|
| 1,491,974 | 4/1924 | Shaffer | 294/26.5 |
| 2,216,984 | 10/1940 | Pearson | 99/426 X |
| 3,255,932 | 6/1966 | Hunter | 222/183 |
| 3,410,700 | 11/1968 | Gstohl | 426/107 |
| 3,547,660 | 12/1970 | Weisberg | 426/110 |
| 3,597,238 | 8/1971 | Scharre | 426/113 |
| 3,606,962 | 9/1971 | Scholle | 222/105 |
| 3,819,089 | 6/1974 | Scales | 248/95 |
| 3,993,220 | 11/1976 | Troy | 222/82 |
| 4,074,102 | 2/1978 | Asen | 99/426 |
| 4,096,948 | 6/1978 | Kuchenbecker | 426/113 X |
| 4,143,165 | 3/1979 | Daswick | 426/113 |
| 4,190,757 | 2/1980 | Turpin et al. | 426/107 X |
| 4,228,945 | 10/1980 | Wysocki | 219/10.55 E X |
| 4,283,427 | 8/1981 | Winters | 426/107 |
| 4,286,136 | 8/1981 | Mason | 99/425 |
| 4,393,757 | 7/1983 | Welsh | 99/369 |
| 4,499,353 | 2/1985 | Shields | 206/470 |

FOREIGN PATENT DOCUMENTS 1132700  3/1957  France ................... 99/380

Primary Examiner—Johnny D. Cherry
Attorney, Agent, or Firm—Robert D. Teichert

[57] ABSTRACT

A cooking device for holding a food pouch to be heated in a microwave oven comprises a molded plastic receptacle formed to provide a bottom wall, have a pair of opposed side walls and a pair of opposed end walls upstanding therefrom. One of the end walls is separated vertically in its central area into two parts, and the bottom wall is bifurcated thereby providing side walls movable away from and toward one another. A food pouch disposed within the side walls and end walls and resting on the bottom wall is positioned so that a marginal portion of the food pouch is disposed in the vertical separation of the one end wall whereby movement of the side walls toward one another will cause the two parts of the one end wall to grip the marginal portion. The pouch holder can be grasped and manipulated to transport and empty the food pouch without the necessity of handling the food pouch directly.

10 Claims, 2 Drawing Sheets

COOKING DEVICE FOR HOLDING FOOD-CONTAINING BAGS

BACKGROUND OF THE INVENTION

The present invention relates to cookware for use in microwave ovens and more particularly to a cooking utensil for holding a food-containing pouch to be placed in a microwave oven.

The convenience of pre-cooked foods which are packaged in flexible envelopes or pouches and which also serve as the cooking utensil for the food is a desirable feature firmly established in the marketplace. The inconvenience of using tongs, hot pads, etc. to retrieve the heated pouch from a pot of boiling water or a convection type oven has not proved a deterrent since the sales of such frozen food products has increased year after year.

The advent of the microwave oven with its abbreviated cooking cycles resulted in an even greater demand for precooked frozen foods, although handling of the heated pouch remained a problem.

In addition to the retrieval of the heated pouch, there is the problem of handling the pouch the extract the food and transfer it to a suitable container for consumption. Such handling is compounded by the fact that the heated food is now soft and/or fluid and is not supported by the flexible pouch, thereby making it difficult to handle the pouch for removal of the contents.

SUMMARY OF THE INVENTION

A simple explanation of microwave cooking is that the microwaves (high frequency radio waves) penetrate $\frac{3}{4}$ to $1\frac{1}{4}$ inches through all food surfaces, (top, bottom and sides), at which depth cooking begins. Heat is then conducted inwardly and outwardly. Thus, microwave energy heats the food and not the utensil holding the food. Utensils become warm only when heat from the food is transferred to them.

Recognizing these facts, this invention provides a utensil for holding, retrieving and handling a heated pouch of food, especially for use in a microwave oven.

In a preferred embodiment, the invention comprises a pouch holder molded from a microwave compatible plastic material to provide a bottom wall having upstanding opposed side walls and upstanding opposed front and back end walls. The bottom wall is bifurcated in the area remote from the front end wall and the back end wall comprises wall portions extending upwardly from the terminii of the bifurcated portions of the bottom wall, each back wall portion being integral with its adjacent side wall. Handle members are formed on each side wall adjacent to the area of the back wall and extending outwardly therefrom.

A food pouch placed in the pouch holder will be positioned so that the seam or marginal edge of the food pouch is disposed between the back end wall portions. The pouch will, either in its original frozen shape or its expanded heated shape, exert outward pressure against the opposed side walls which, because of the described bifurcated construction, will be flexed outwardly.

As previously pointed out, even when the food pouch has been heated and is too hot to touch the pouch holder remains relatively cool and can be grasped and handled to transport the heated pouch from the microwave to a serving area. Squeezing or manipulation of the handle members toward one another will flex the side walls inwardly to grip the pouch and cause the back end wall portions to move into abutment with the marginal portion of the pouch disposed therebetween. Thus entrapped, the food pouch can be appropriately cut open and the pouch holder manipulated to dispense the contents of the pouch. Not only does the pouch holder eliminate the need for tongs, gloves or hot pads to handle the heated food pouch, it also provides a simple yet efficient means for avoiding the normally messy or untidy conditions attending extraction of food from pouches.

The foregoing objects, features, and advantages of the present invention will become more apparent from the following description which proceeds with reference to the accompanying drawings.

DETAILED DESCRIPTION OF THE INVENTION

Figure 2:
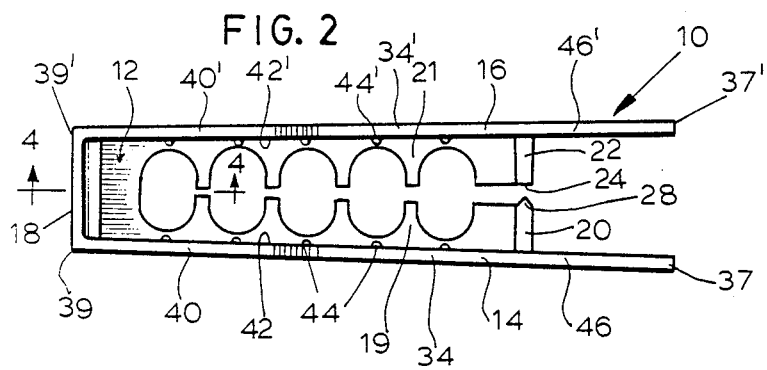
FIG. 2 is a top plan view of the pouch holder.

Referring to the drawings, a cooking utensil or pouch holder, indicated in its entirety by the reference numeral 10, is formed to provide a bottom wall 12 having upstanding therefrom opposed side walls 14 and 16, and an end wall 18 integral with and joining said side walls 14 and 16. As best seen in FIG. 2, the bottom wall 12 is bifurcated at its terminus remote from the end wall 18 and is formed to provide a bottom portion 19 having an upstanding half wall 20 integral with sid wall 14 and a bottom portion 21 having an upstanding half wall 22 integral with side wall 16. The terminal edge 24 of half wall 20 is formed to provide a v-shaped rib 26, whereas the terminal edge 28 of half wall 22 is formed to provide a v-shaped slot 30, the purpose of which will be described later. Depending legs 32 are formed integral with the bottom wall at its junction with the side walls.

Figure 1:
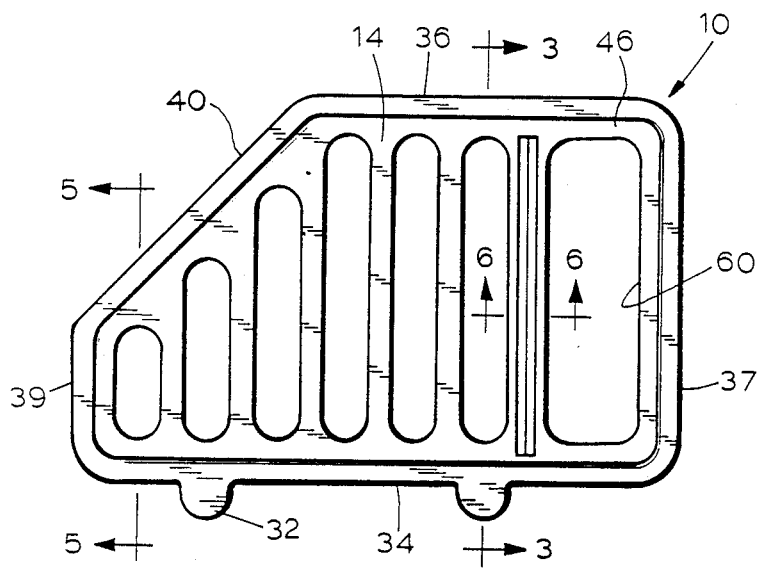
FIG. 1 is a side elevational view of a pouch holder in accordance with the invention.

Referring now to FIG. 1, the side wall 14 has a planar configuration that can be described as generally rectangular but with a corner missing. Specifically, and as shown, the side wall configuration is five-sided having a bottom edge 34, a top edge 36 of less length than said bottom edge, a right or back edge 37, a left or front edge 39 of less length or height than said back edge, and an angled edge 40 joining the top; edge and the front edge. The side wall 16 is a mirror image of side wall 14 and comprises a bottom edge 34', a top edge 36', a back edge 37', a front edge 39', and an angled edge 40'. The inner surface 42 of side wall 14 is formed to provide vertical ribs 44 whereas the inner surface 42' of side wall 16 is formed to provide vertical ribs 44', all for a purpose to be described. Side wall 14 is formed to provide a handle member 46 intermediate the back edge 37 and the half wall 20, while side wall 16 is formed to provide a handle member 46' intermediate its back edge 37' and the half wall 22. The handle members provide grasping or holding means for carrying and manipulating the pouch holder, as will now be explained.

Figure 7:
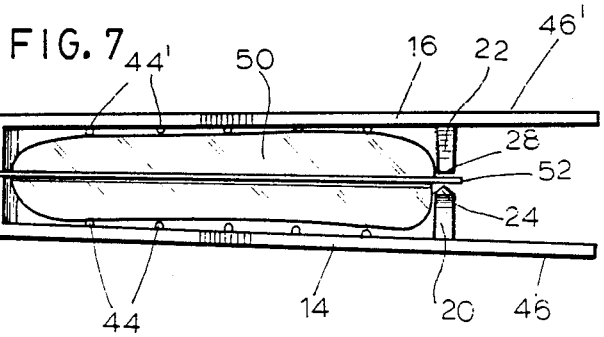
FIG. 7 is a view corresponding to FIG. 2 but showing a food pouch disposed within the pouch holder.

As illustrated in FIGS. 1 through 5, the cooking utensil 10 is a receptacle defined by bottom wall 12, side walls 14 and 16, end or front wall 18 and a pair of half walls 20 and 22. FIG. 7 shows a food pouch 50 being inserted into said receptacle with a portion of the same or marginal edge 52 of the pouch being inserted between the terminal edge 24 of half wall 20 and the terminal edge 28 of half wall 22. The food pouch holder is dimensioned to accommodate the standard food pouch and as shown, the side wall ribs 44 and 44' will be in contact with the outer surface of the food pouch. The bifurcated bottom wall 12 permits outward movement of the side walls 14 and 16 to accommodate a food pouch that is wider in its frozen state or whose contents are such that on heating, the contents settle and widen the pouch.

Figure 8:
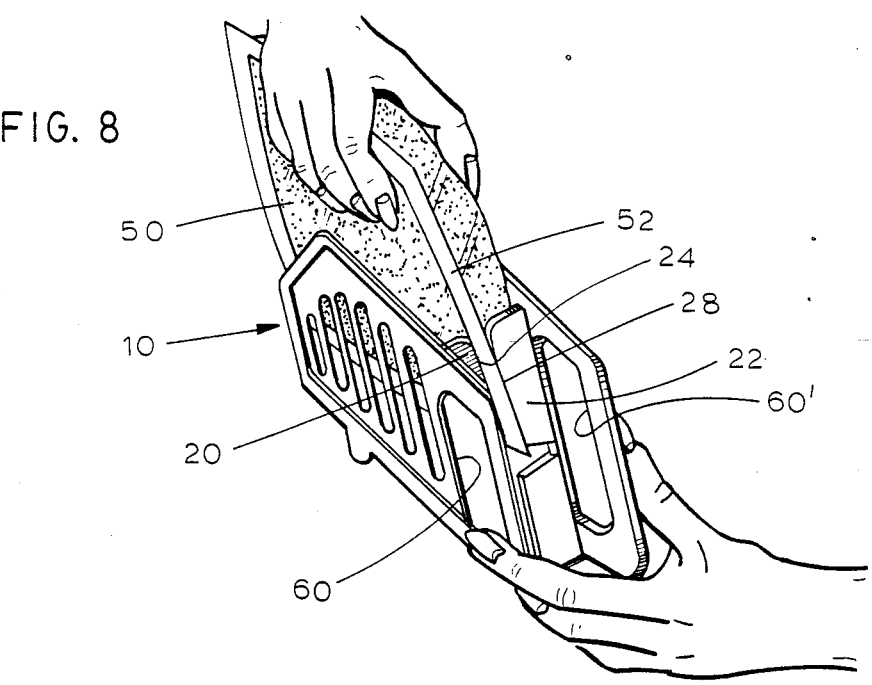
FIG. 8 is a perspective view illustrating disposition of a food pouch in the pouch holder.

FIG. 8 illustrates disposition of a frozen food pouch 50 in the pouch holder 10 with the marginal edge 52 of the food pouch being positioned between the opposing edges 24 and 28 of half walls 20 and 22, respectively. If the food pouch is wider than the spaced apart distance of the side walls 14 and 16 when the half walls 20 and 22 are in abutment, then the bifurcated bottom wall 12 will allow outward movement of said side walls to permit disposition of the pouch into the receptacle. Contrariwise, if the food pouch is thinner than the spaced apart distance of the side walls 14 and 16 when the half walls 20 and 22 are in abutment, then the bifurcated bottom wall 12 in its quiescent state, as shown in FIG. 2, also allows insertion of the marginal edge 52 of the food pouch 50 between the half walls 20 and 22 when the food pouch is disposed within the pouch holder.

Figure 3:
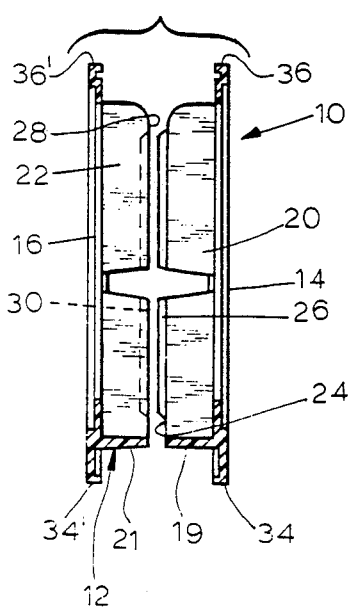
FIG. 3 is a vertical sectional view taken along line 3—3 of FIG. 1.
Figure 6:
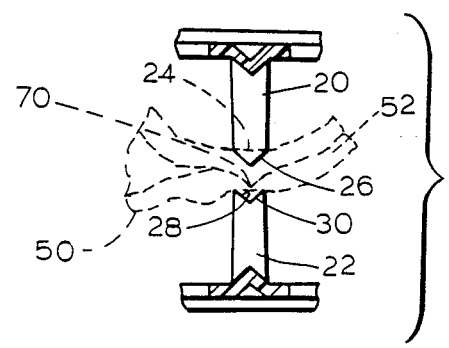
FIG. 6 is a sectional view taken along line 6—6 of FIG. 1 on an enlarged scale.

The pouch holder of this invention is made of a molded plastic microwave compatible material which, as shown in FIG. 2, has an original set or quiescent state wherein the side walls 14 and 16 diverge slightly away from the front wall 18 so that the half walls 20 and 22 are spaced apart. FIGS. 3, 6 and 7 show the disposition of said half walls in a quiescent state.

Figure 4:
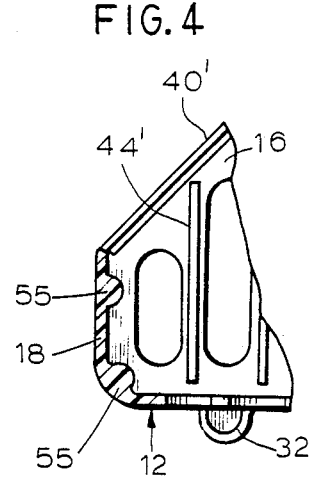
FIG. 4 is a sectional view taken along line 4—4 of FIG. 2 on an enlarged scale.
Figure 5:
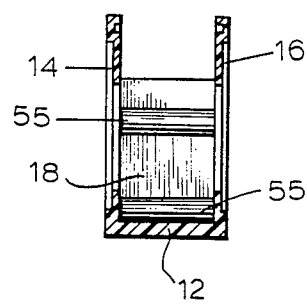
FIG. 5 is a vertical sectional view taken along line 5—5 of FIG. 1.

Referring now to FIGS. 4 and 5, cross ribs 55 molded into the front wall 18 and integral with the side walls 14 and 16 provide strength for the front wall and act to produce a spring-like action urging the side walls to their quiescent state. It should be understood that while the bifurcation of the bottom wall 12 to provide bottom portions 19 and 21 having upstanding half walls 20 and 22, respectively, is shown in the embodiment herein as being approximately 85% of the bottom wall length, the bifurcation can be greater or less than that shown. The degree of bottom wall bifurcation will certainly effect the overall rigidity of the pouch holder 10 and thus the ease of flexing and outward movement of the side walls 14 and 16. However, it is the front wall 18 that provides the principal connection of and pivot point for the side walls 14 and 16, and it is only necessary that the quiescent rigidity of the pouch holder be such that the bottom portions 19 and 21 cooperate to act as a bottom wall and that the half walls 20 and 22 cooperate to act as a back wall. Thus, it may be desirable to have a wholly bifurcated bottom wall or a bottom wall with a relatively small portion of bifurcation.

Likewise, the precise shape of the half walls 20 and 22 or the cross-sectional configuration of the terminal edges 26 and 28, respectively, can be varied provided that the disposition of said half walls in a quiescent state is such that together they effectively provide a wall element adjacent the handle members 46 and 46', and that the cross-sectional configuration of said terminal edges is sufficient to provide gripping or retaining means for cooperative action in acting against the material disposed therebetween.

Also, while the embodiment of the invention as shown provides a desirable handle configuration and construction, it is only necessary that there be a handle area at and immediately adjacent the half walls 20 and 22 so that flexing and movement of the side walls 14 and 16 inwardly will function to move the terminal edges 24 and 28 toward abutment one with the other. The extension of the handle members 46 and 46' outwardly from the half walls 20 and 22 provides a substantial portion of the pouch holder that is not in direct contact with the heated food pouch 50 and thus relatively cool to the touch. In this respect it should be noted that the various openings formed in the bottom, side and back walls of the holder 10 are for ambient air circulation to assist in dissipation of heat transferred from the heated pouch to the pouch holder walls.

Figure 9:
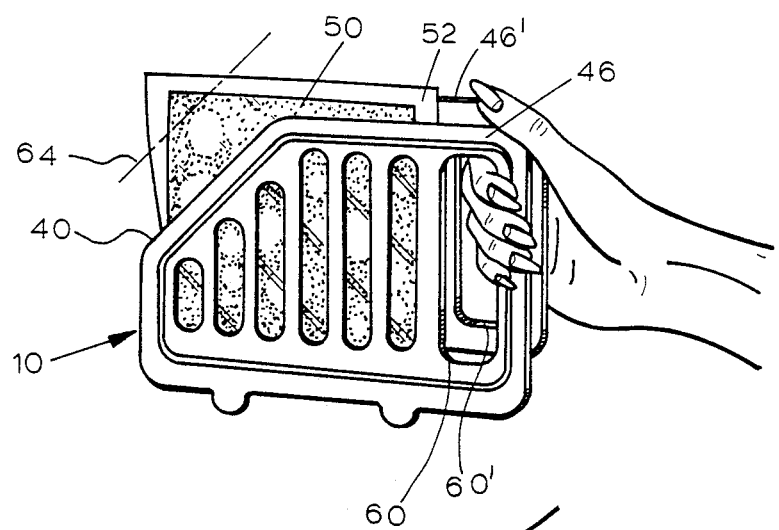
FIG. 9 is a perspective view illustrating handling of the pouch holder for transporting a food pouch disposed therein.

FIG. 9 illustrates a manner of handling the pouch holder 10 with a food pouch 50 disposed therein for movement into or out of a microwave oven, not shown. The handle members 46 and 46' of side walls 14 and 16, respectively, have open areas 60 and 60', respectively, which are designed to afford a means for the insertion of the user's fingers and hand in a firm and positive manner. Reference numeral 64 indicates a proposed cut line for removing a portion of the food pouch 50 to obtain access to the food therein. The necessity for the angle edges 40 and 40' to expose a portion of the food pouch for cutting to provide a means of removing the food from the pouch should be apparent and will now be described.

Figure 10:
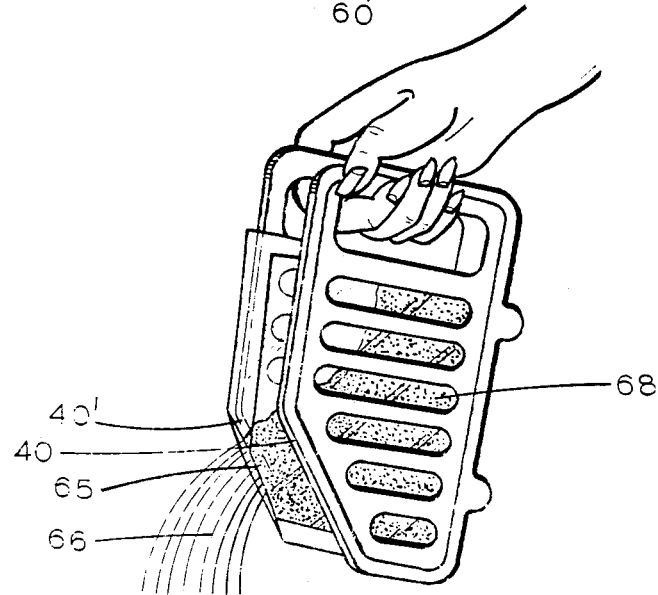
FIG. 10 is a perspective view illustrating manipulation of the pouch holder to dispense the contents of the food pouch.

FIG. 10 shows the food pouch 50 with a corner thereof removed, as indicated by the cut line 64, to provide a discharge spout 65 and manipulation of the pouch holder 10 to permit movement of the pouch contents out of the pouch as indicated by reference numeral 66. It should be noted that the food contents, now in a heated and viscous condition, have settled in the bottom area of the pouch, indicated by refence numeral 68, and as the pouch holder is tilted, the contents will be discharged by gravity. Obviously, squeezing of the handles 46 and 46' will cause side wall ribs 44 and 44' to exert pressure on the food pouch not only assisting in the discharge rate of the food from the pouch, but also in holding the bag firmly within the holder. However, it should be understood that the primary means of restraining the pouch from being itself discharged from the holder is the entrapment of a portion of the pouch marginal edge 52 between the terminal edges 24 and 28 of the half walls 20 and 22, respectively. As shown in FIG. 6, the complementary surfaces of the v-shaped rib 26 of terminal edge 24 and the v-shaped slot 30 of terminal edge 28 provides a positive means for convolution and entrapment of the pouch marginal edge as indicated by the dotted line 70.

While the primary object of this invention is directed to use with microwave ovens, it can be used in a very positive manner with food pouches heated in a convection oven or in boiling water on the range. Obviously, the holder could not be placed in the convection oven or boiling water since it would become heated itself and be too hot for handling except with tongs, hot pads, etc.; also, the microwave compatible plastic would distort or fracture under such heat. However, this invention would nevertheless provide a useful receptacle to receive a heated pouch after its removal from a convection oven or boiling water since the problem of handling, opening and emptying a heated pouch is still a problem no matter how the food pouch is heated.

Having illustrated and described the principles of this invention by what is presently a preferred embodiment, and having suggested several possible alternative embodiments, it should be apparent to persons skilled in the art that the invention permits of modification in arrangement and detail without departing from the spirit and scope of the invention as set forth in the appended claims.

What is claimed is:

1. A cooking device for holding a food pouch especially for heating in a microwave oven, comprising a bottom wall, a pair of opposed side walls extending upwardly from said bottom wall, a front wall extending upwardly from the bottom wall intermediate said side walls and integral therewith, said bottom wall bifurcated, each side wall having an inwardly extending back wall formed integral therewith at the side wall terminus remote from said front wall, said back walls having opposed spaced apart edges movable for releasable gripping engagement with a portion of said pouch.

2. A cooking device according to claim 1 wherein each of said side walls is formed to provide a handle member adjacent the back wall extending outwardly therefrom.

3. A cooking device according to claim 2 wherein said side walls are of elongated planar configuration having one edge thereof shaped so that a portion of said pouch extends outwardly from the cooking device beyond said one edge.

4. A cooking device according to claim 2 wherein each said handle member includes a finger opening formed therein.

5. A cooking device according to claim 2 wherein the said side walls are formed to provide rib members extending from the inner surface thereof.

6. A cooking device according to claim 2 wherein the said side walls are formed to provide vents therethrough.

7. A cooking device according to claim 1 wherein a portion of said bottom wall adjacent said front wall is not bifurcated.

8. A cooking device according to claim 1 wherein the front wall is formed with at least one cross rib extending to and integral with the opposed side walls.

9. A cooking device according to claim 1 wherein the opposed spaced apart edges of said back walls have irregular surfaces.

10. A cooking device according to claim 9 wherein said irregular surfaces include a rib formed on one back wall edge and a complementary slot formed in the other back wall edge.

* * * * *